March 13, 1962
M. PADALINO
3,025,352
SIGNAL IDENTIFICATION SYSTEM
Filed June 27, 1960
3 Sheets-Sheet 1

INVENTOR.
MARCO PADALINO
BY Philip M. Bolton
ATTORNEY

March 13, 1962 M. PADALINO 3,025,352

SIGNAL IDENTIFICATION SYSTEM

Filed June 27, 1960 3 Sheets-Sheet 2

INVENTOR.
MARCO PADALINO
BY Philip M. Bolton
ATTORNEY

March 13, 1962 M. PADALINO 3,025,352

SIGNAL IDENTIFICATION SYSTEM

Filed June 27, 1960 3 Sheets-Sheet 3

INVENTOR.
MARCO PADALINO
BY Philip M. Bolton
ATTORNEY

United States Patent Office 3,025,352
Patented Mar. 13, 1962

3,025,352

SIGNAL IDENTIFICATION SYSTEM

Marco Padalino, Yonkers, N.Y., assignor to International Telephone and Telegraph Corporation, Nutley, N.J., a corporation of Maryland Filed June 27, 1960, Ser. No. 39,076
5 Claims. (Cl. 179—17)

This invention relates to signal identification systems and more particularly to a system for identifying subscriber tone signals at a central office.

In the past there have been various arrangements suggested for identifying party line stations. For example, arrangements have been proposed to have the subscriber's party line station tested for identification by tone signals emanating from the central office when a call from such station has been initiated. In other arrangements the calling party provides a double tone identification tone signal either upon the lifting of the subscriber's receiver or during a subsequent dial operation. An even more preferable arrangement is a system using only a single tone identification signal for each subscriber with an individual oscillator device producing the tone at each of the subscriber stations.

Collaterally with the problem of identifying a station there is the problem of reducing or eliminating the possibility of false identification. When dial contacts are broken or made there is a transient pulse passed along the telephone loop. This transient pulse passing around the loop often gives rise to false identification by energizing certain relays in the system. This is especially true where frequency tones are used to identify the station. In addition to the transient pulses which are spawned by the making and breaking of the dial contacts, there are erroneous frequency tones produced when the oscillator is started and before the oscillator reaches its steady state. These erroneous frequency tones, very often also give rise to a false identification and therefore present an undesired problem.

The prior art as discussed hereinabove uses a plurality of tone detector equipments at the central station with one each being assigned to a separate party line. These arrangements require the tone oscillators to be very precisely tuned to correspond with the equal spacing of the center frequencies of the signal channels. Further, the prior art arrangements fail to reduce the false identification resulting from either the transient pulses or the erroneous frequency tones described above. It follows, that a telephone system which has signal identification equipment which is used with more than one line, and where the tone oscillators are not required to be precisely tuned, and which reduces false identification caused by either transient pulses or erroneous frequency tones, is highly desirable.

An object of the present invention is to provide an improved identification system for identifying, in a relatively short time, subscriber tone signals on a line or lines having a relatively large number of subscribers stations thereon.

Another object of the present invention is to provide a tone identification system wherein the possibility of erroneous identification due to transient conditions is reduced, and where the tolerance required of the tone signal may be within wide limits.

A feature of the present invention is the provision of a tone signal identification system comprising means for receiving an incoming tone signal having a given one of a plurality of discrete frequencies, a first means responsive to the incoming signal to provide output pulses at a frequency proportional to the frequency of the incoming signal, gating means coupled to the output of the responsive means, a second means responsive to the output pulses of the responsive means to enable the gating means to pass the output pulses of the first responsive means for a predetermined time period, counting means coupled to the output of the gating means to count the number of pulses gated therethrough in the predetermined time period, and means coupled to the counting means to produce an output signal representative of the pulse count of the counting means.

A further feature of the present invention is the provision of a tone signal identification system of the type described wherein the gating, counting, and switching means operate by means of digital logic.

The above-mentioned and other features and objects of this invention will become more apparent by reference to the following description taken in conjunction with the accompanying drawings, in which.

Figure 1:
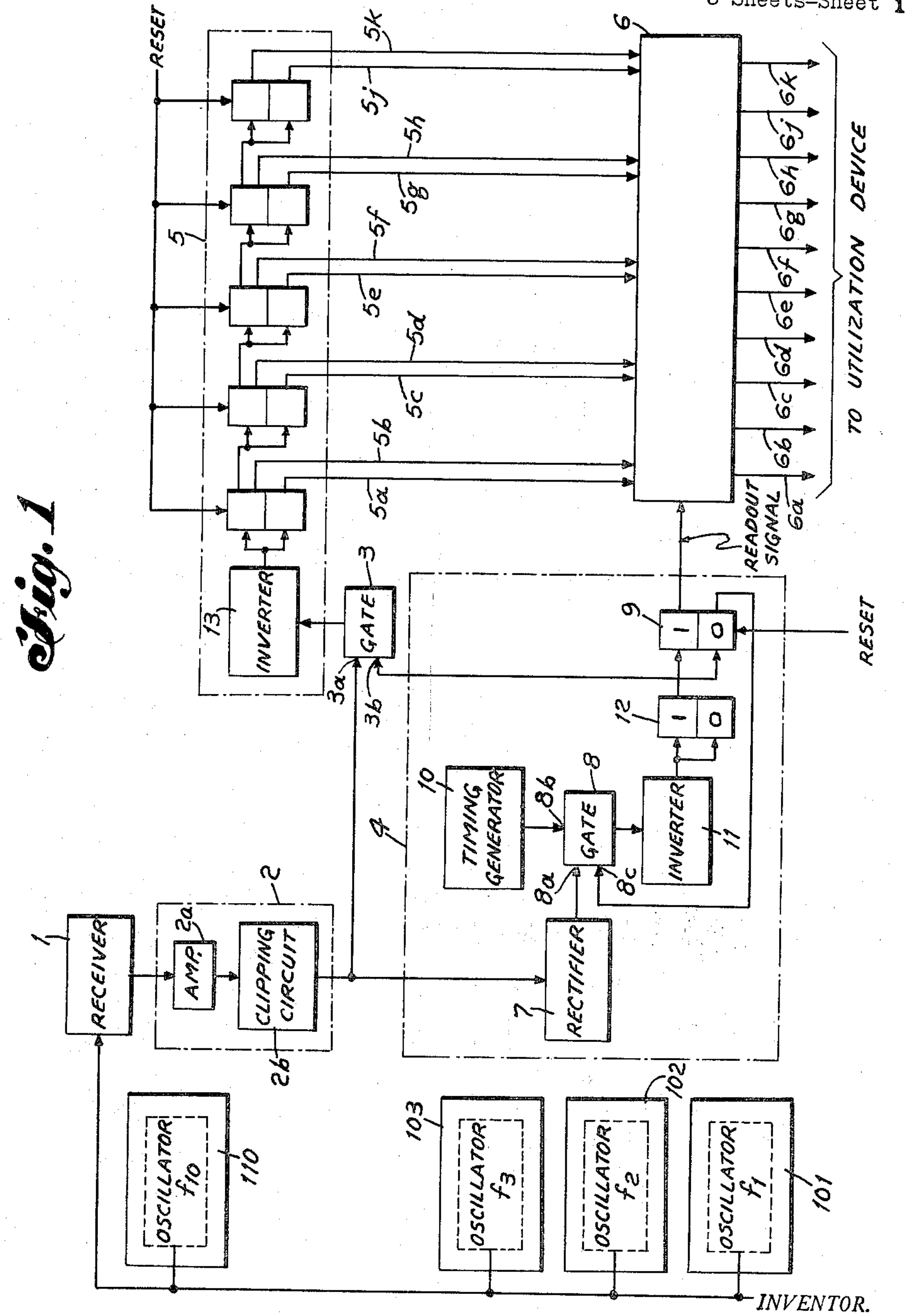
FIG. 1 is a block diagram of a tone signal identification system following the principles of the present invention.

Referring to FIG. 1, a tone signal identification system is shown comprising means 1 for receiving an incoming tone signal, means 2 to provide output pulses at a frequency proportional to the frequency of the incoming signal, gating means 3 coupled to the output of means 2, triggering means 4 responsive to the output pulses of means 2 to enable gating means 3 to pass the output pulses from means 2 for a predetermined time period, counting means 5 coupled to the output of gating means 3 to count the number of pulses gated therethrough in said predetermined time period, and switching means 6 coupled to counting means 5 to produce an output signal representative of the pulse count of counting means 5.

More particularly, receiving means 1 receives an incoming tone signal from any one of a plurality of subscriber stations designated as 101 to 110. As shown in FIG. 1, each subscriber station will be identified by a separate tone signal which differs in frequency from each of the other tone signal frequencies. In a specific instance the following tone signal frequencies were found to satisfactorily operate with the system shown in FIG. 1. It is to be noted that the tolerance of the tone frequencies is of wide latitude.

TABLE 1

| Subscriber Station | Theoretical Tone Frequency (cps.) | Frequency Tolerance (cps.) |
|---|---|---|
| 101 | $f_1$—250 | 200–320 |
| 102 | $f_2$—450 | 400–540 |
| 103 | $f_3$—650 | 600–760 |
| 104 | $f_4$—950 | 840–1,030 |
| 105 | $f_5$—1,300 | 1,210–1,400 |
| 106 | $f_6$—1,600 | 1,515–1,700 |
| 107 | $f_7$—1,900 | 1,810–2,000 |
| 108 | $f_8$—2,200 | 2,100–2,300 |
| 109 | $f_9$—2,550 | 2,420–2,700 |
| 110 | $f_{10}$—2,950 | 2,800–3,100 |

Figure 2:
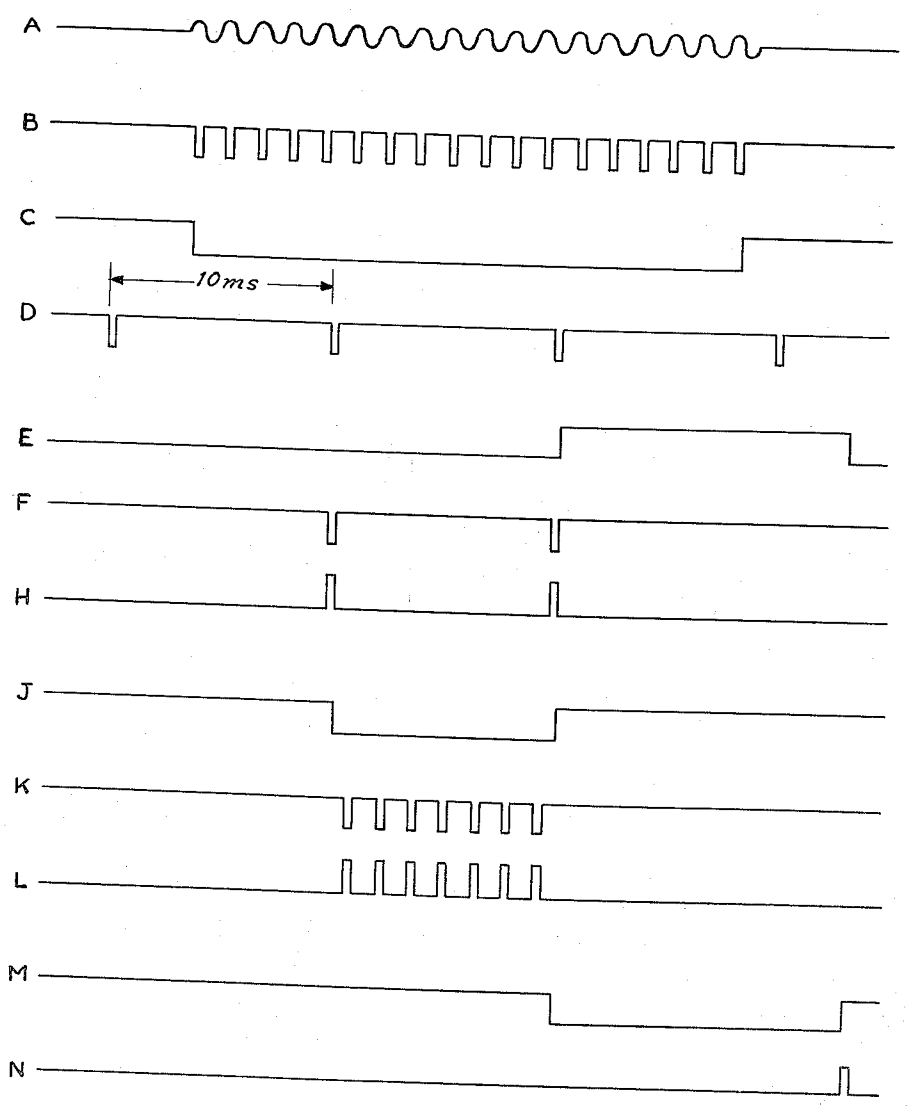
FIG. 2 is a timing diagram illustrating the relationship in time between the various waveforms related to FIG. 1.

After being received by means 1, the incoming tone signal, which is sinusoidal in form, is converted into a series of negative pulses occurring at a frequency equal to the incoming signal frequency. This signal conversion is accomplished by means 2 which includes an amplifier *2a* and a clipping circuit *2b*. When the incoming signal is amplified and the positive portion and the negative peak portion is removed by the clipping circuit, a negative pulse will be produced for each cycle of input signal frequency. Referring to FIG. 2, curve A represents a typical input tone signal and curve B represents the output signal from means 2. The output pulses from means 2 is continually applied to terminal *3a* of gate 3 which thereby remains clamped until the occurrence of a trigger signal, to be described hereinbelow.

The output pulses from means 2 is also applied to triggering means 4. Triggering means 4 includes a rectifier 7 which, upon the reception of the negative pulses from means 2, provides a negative signal to terminal 8*a* of gate 8 for the duration of the incoming tone signal. Referring to FIG. 2, the output of rectifier 7 is illustrated by curve C. Triggering means 4 further includes a flip-flop circuit 9, which is initially in the state as illustrated in FIG. 1, to provide ground signal to switching means 6 and a negative signal to terminal 8*c* of gate 8, as illustrated by FIG. 2, curve E. (In the flip-flop circuits of FIG. 1, "1" represents ground signal and "0" represents negative signal since the various gates are designed to operate with negative logic). Gate 8 therefore has a negative signal at terminals 8*a* and 8*c*. A timing generator 10, also included in triggering means 4, is coupled to gate 8 at terminal 8*b*. Timing generator 10 produces negative pulses at fixed time intervals as illustrated by FIG. 2, curve D. The first output pulse of generator 10 occurring after the reception of the incoming tone signal will enable gate 8 and pass therethrough to be inverted by inverter 11 and the resulting positive pulse will trigger flip-flop 12. Flip-flop 12, which was initially in the state as illustrated in FIG. 1, will now provide a negative signal at terminal 3*b* of gate 3. Gate 3 will now pass the negative pulses from means 2 to an inverter 13 and then to counter 5 which will immediately begin to count the positive (inverted) pulses, each of which represents a cycle of incoming signal frequency. The change of state of flip-flop circuit 12, being negative going will not affect flip-flop circuit 9, which will continue to provide negative signal to gate 8.

After a predetermined period of time has elapsed, which for purposes of explanation will be selected as 10 milliseconds, another negative pulse will be produced from timing generator 10. Since negative signal is still present at terminals 8*a* and 8*c* of gate 8, this next timing pulse will appear as a positive trigger pulse at flip-flop circuit 12 and cause it to change back into its original state. Flip-flop circuit 12, in returning to its original state, will inhibit gate 3 and trigger flip-flop circuit 9 which now places ground signal at terminal 8*c*, thereby inhibiting gate 8. At this moment no further pulses pass through gate 3 and counter 5 ceases counting. Flip-flop circuit 9 also provides a read-out pulse to switching means 6, which will be further discussed hereinbelow.

Referring to FIG. 2, it is seen that the negative pulses from timing generator 10 (curve F) become positive pulses at the output of inverter 11 (curve H). The first positive pulse from inverter 11 causes a negative signal to appear at terminal 3*b* of gate 3 by means of flip-flop circuit 12 (curve J). While the signal illustrated by curve J appears at gate 3, the negative pulses from means 2 (curve K) will pass through and be inverted by inverter 13. The positive pulses from inverter 13 (curve L) will be counted by counter 5 until the occurrence of the second timing pulse (curve F) ceases the system operation by causing the ouput of flip-flop circuits 12 and 9 to return to ground (curves J and E) and a read-out pulse (curve M) to be applied to switching means 6.

Counter 5 accepts the positive pulses from inverter 13 for the predetermined period between timing pulses from generator 10, which has been selected as 10 milliseconds, and produces a binary count of the number of pulses received. Counter 5 may be any binary counter capable of counting input pulses, as for example the type described on page 177 of "Digital Computer Components and Circuits" by R. K. Richards.

The binary output signals from counter 5 will represent, in conventional binary code, the number of pulses counted in the ten millisecond period. A conventional switching matrix could be provided coupled to the output of counter 5, such as shown by switching means 6, and could provide a separate output line for each number of pulses counted within the 10 millisecond period. For example, consider the ten possibe tone signal frequencies (and their tolerances) set forth in Table 1. The number of pulses counted within the 10 milliseconds could possibly be 2, 3, 4, 5, . . . up to 31. However, a count of 2 or 3 would determine a tone from subscriber station 101, a count of 4 or 5 determines subscriber station 102, and so on until a count from 28 to 31 would determine subscriber station 110. A conventional diode matrix could be employed having 31 output lines with redundant output lines combined i.e. output lines 28 to 31 could be combined since an output signal on anyone of such lines identifies subscriber station 110.

Figure 3:
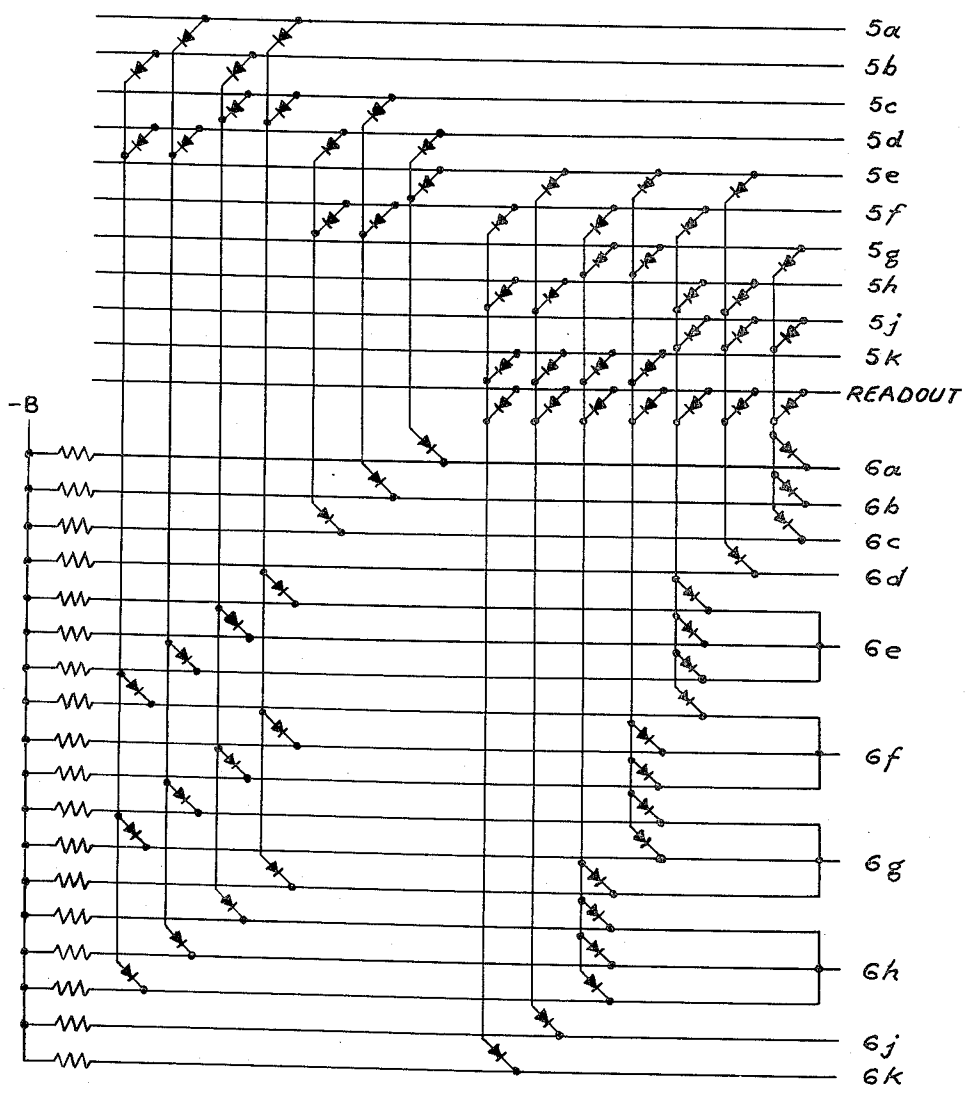
FIG. 3 is a schematic of a switching matrix useful in the operation of the system of FIG. 1.

A more economical and simple matrix for use as switching means 6 is shown in FIG. 3. Realizing, as stated above, that the separate tone signal frequencies are determined by more than one count, the matrix of FIG. 3 was designed to reduce the number of diodes necessary for switching. The matrix of FIG. 3 operates in the same manner as a conventional diode matrix with the exception that, whenever possible, separate pulse counts will produce an output on a common output line. For example, subscriber station 110 will be identified by a pulse count of 28, 29, 30, or 31. These pulse counts also happen to be the only binary numbers from 1 to 31 which have a "mark" in the last three bit positions, therefore the mark outputs of the last three binaries of counter 5 (conductors *5f*, *5h*, *5k*, of FIG. 3) are sufficient to individuate the output line related to subscriber station 110.

Switching means 6 includes ten output lines (6*a* to 6*k*), one of which will have an output thereon in accordance with which subscriber station is producing the incoming tone signal. These output lines may be connected to some utilization device for indicating, metering, recording, or some other function which may be desirable at the central office.

When the read-out of switching means 6 is complete, and no further output signal therefrom is desired by the utilization device, a reset pulse is required, either manually or from the utilization device itself, to reset counter 5 and flip-flop circuit 9. The operation of the reset pulse in returning the system to its initial condition can be readily understood by reference to curve N (reset) and curves E and M of FIG. 2.

It is important to note that read-out of switching means 6 will not occur until after the fixed time period determined by timing oscillator 10 has elapsed. At this time a frequency of at least 200 c.p.s. is necessary in order to produce an output from switching means 6, and therefore spurious signals and noise is less likely to cause erroneous operation of the present system. Further, since a considerable variation in the incoming tone signal frequency is allowable (as seen from Table 1) the tone oscillators used in the subscriber stations need not be exceptionally precise and may consequently be inexpensive. Also, the system as described hereinabove will identify an incoming tone signal within a maximum of 20 milliseconds.

It is to be understood that the frequency values set forth in Table 1, and the selected time period of 10 milliseconds for the timing generator are not restrictions, and that the present invention, as embodied in the system of FIG. 1 may be adapted to operate for more or less than 10 input tone signals, and the counting operation may be designed for a time period either greater or less than the suggested 10 milliseconds.

While I have described above the principles of my invention in connection with specific apparatus, it is to be clearly understood that this description is made only by way of example and not as a limitation to the scope of my invention as set forth in the objects thereof and in the accompanying claims.

I claim:

1. A tone signal identification system comprising means for receiving an incoming tone signal having a given one of a plurality of discrete frequencies, means responsive to said incoming signal to provide output pulses at a frequency proportional to the frequency of said incoming signal, gating means coupled to the output of said responsive means, triggering means responsive to said output pulses from said responsive means to enable said gating means to pass said output pulses from said responsive means for a predetermined time period, counting means coupled to the output of said gating means to count the number of pulses gated therethrough in said predetermined time period, and means coupled to said counting means to produce an output signal representative of the pulse count of said counting means.

2. A tone signal identification system comprising means for receiving an incoming tone signal having a given one of a plurality of discrete frequencies, means responsive to said incoming signal to provide output pulses at a frequency proportional to the frequency of said incoming signal, a timing generator for producing pulses at given time intervals, a first gating means responsive to said output pulses and said output of said timing generator to produce a triggering signal for a predetermined time period, a second gating means responsive to said output pulses and said triggering signal to pass said output pulses for said predetermined time period, counting means coupled to the output of said second gating means to count the number of pulses gated therethrough in said predetermined time period, and switching means coupled to said counting means to produce an output signal representative of the pulse count of said counting means.

3. A tone signal identification system according to claim 2 wherein said switching means includes a diode switching matrix having a plurality of discrete output conductors, each conductor thereof capable of maintaining a separate output signal representative of a separate pulse count of said counting means.

4. A tone signal identification system comprising means for receiving an incoming tone signal having a given one of a plurality of discrete frequencies, means responsive to said incoming signal to provide output pulses at a frequency equal to the frequency of said incoming signal, a gating means coupled to the output of said responsive means, means responsive to said output pulses of said responsive means to produce a first and second trigger pulse separated by a given time interval, a bistable switch responsive to said first and second trigger pulses and coupled to said gating means to enable said gating means to pass said output pulses from said responsive means for said given time interval, binary counting means coupled to said gating means to count said output pulses from said means responsive passing therethrough in said given time period, and switching means coupled to said counting means to produce an output signal representative of the binary pulse count of said counting means.

5. In a communication system having a central office responsive to signals from a plurality of subscriber stations wherein each subscriber station is identified at said central office by a separate tone signal of a given discrete frequency, an identification system comprising means for receiving an incoming tone signal, means responsive to said incoming signal to provide output pulses at a frequency equal to the frequency of said incoming signal, a first gate coupled to the output of said responsive means, a rectifier means coupled to the output of said responsive means to rectify said output pulses, a timing generator for producing timing pulses at given time intervals, a second gate coupled to the output of said rectifier and said generator, a first switching circuit coupled to the input of said second gate to enable said gate to pass said timing pulses from said generator, said first switching circuit also being coupled to the output of said second gate and responsive to the first timing pulses therefrom to enable said first gate to pass said output pulses from said responsive means and responsive to the second timing pulse to inhibit said first gate and said second gate after said given time interval, a binary counter coupled to the output of said first gate to produce a binary count of the output pulses of said responsive means passed through said first gate in said given time interval, and a second switching circuit coupled to the output of said binary counter to produce an output signal representative of the binary count of said counter.

No references cited.